(12) United States Patent
Fowler et al.

(10) Patent No.: US 8,272,675 B2
(45) Date of Patent: Sep. 25, 2012

(54) EQUIPMENT MOUNTING MODULE FOR INSTRUMENT PANEL

(75) Inventors: James Hugh Fowler, Novi, MI (US); Thomas W. Pietila, Brighton, MI (US); Anthony Ligi, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 12/720,806

(22) Filed: Mar. 10, 2010

(65) Prior Publication Data

US 2011/0221224 A1    Sep. 15, 2011

(51) Int. Cl.
*B62D 25/14*    (2006.01)
(52) U.S. Cl. .......................................................... 296/70
(58) Field of Classification Search ..................... 296/72; 361/825
See application file for complete search history.

(56) References Cited

U.S. PATENT DOCUMENTS

| | | | |
|---|---|---|---|
| 5,549,344 A | 8/1996 | Nishijima et al. | |
| 5,678,877 A | 10/1997 | Nishijima et al. | |
| 5,685,595 A | 11/1997 | Nishijima et al. | |
| 5,979,965 A | 11/1999 | Nishijima et al. | |
| 6,176,544 B1 | 1/2001 | Seksaria et al. | |
| 6,213,504 B1 | 4/2001 | Isano et al. | |
| 6,494,526 B2 | 12/2002 | Uno | |
| 6,641,195 B2 | 11/2003 | Shikata et al. | |
| 6,669,273 B1 | 12/2003 | Glovatsky et al. | |
| 6,854,778 B2 | 2/2005 | Lee | |
| 6,932,410 B2 | 8/2005 | DeLong et al. | |
| 7,478,857 B2 | 1/2009 | Jeon | |
| 7,503,622 B2 | 3/2009 | Vican | |
| 7,658,432 B2 | 2/2010 | Lota | |
| 2001/0042812 A1* | 11/2001 | Perzewski | 248/27.1 |
| 2002/0084635 A1* | 7/2002 | Tajima et al. | 280/732 |
| 2002/0101093 A1 | 8/2002 | Berteaux et al. | |
| 2002/0158512 A1* | 10/2002 | Mizutani et al. | 307/9.1 |
| 2002/0196201 A1* | 12/2002 | Rosen | 345/7 |
| 2003/0043029 A1* | 3/2003 | Ichikawa et al. | 340/435 |
| 2004/0109575 A1* | 6/2004 | Thigpen | 381/302 |
| 2005/0082801 A1* | 4/2005 | Koh | 280/732 |
| 2005/0099705 A1* | 5/2005 | Matsuura et al. | 359/831 |
| 2005/0144819 A1* | 7/2005 | Shimizu et al. | 40/491 |
| 2005/0259034 A1* | 11/2005 | Harada et al. | 345/7 |
| 2006/0072331 A1* | 4/2006 | Yamaguchi et al. | 362/473 |
| 2007/0108926 A1* | 5/2007 | Choi | 318/280 |
| 2007/0138822 A1* | 6/2007 | Feit et al. | 296/70 |
| 2009/0085368 A1 | 4/2009 | Coffelt et al. | |
| 2009/0284038 A1* | 11/2009 | Sato | 296/72 |

(Continued)

FOREIGN PATENT DOCUMENTS

JP    2000025652 A  *  1/2000

(Continued)

*Primary Examiner* — H Gutman
(74) *Attorney, Agent, or Firm* — Raymond L. Coppiellie; Brooks Kushman P.C.

(57) ABSTRACT

A mounting bracket is attached to an instrument panel frame, and an aperture is formed in an upper surface of an instrument panel housing in alignment with the bracket to provide a hardpoint for attaching an adapter module. The adapter module is removably secured to the mounting bracket and is provided with component mounting features for securing electrical components such as a radio or radar device. Vehicle electric wiring internal to the instrument panel housing is easily connected with wiring associated with the components. The apparatus allows cost-effective and efficient customization of electrical components mounted to a vehicle instrument panel.

11 Claims, 8 Drawing Sheets

U.S. PATENT DOCUMENTS

| | | | |
|---|---|---|---|
| 2010/0091997 A1* | 4/2010 | Tiwari et al. | 381/1 |
| 2010/0161220 A1* | 6/2010 | Masuda et al. | 701/208 |
| 2010/0244419 A1* | 9/2010 | Maripudi | 280/743.2 |

FOREIGN PATENT DOCUMENTS

| | | | |
|---|---|---|---|
| JP | 2008290508 A | * | 12/2008 |
| WO | 2009019403 A2 | | 2/2009 |

\* cited by examiner

EQUIPMENT MOUNTING MODULE FOR INSTRUMENT PANEL

BACKGROUND

1. Technical Field

The present invention relates to apparatus for mounting electrically powered components to the upper surface of an instrument panel in an automotive vehicle.

2. Background Art

It is common practice in the automotive industry to supply vehicles for use by commercial businesses, emergency response agencies, and/or law enforcement agencies by modifying passenger vehicles that are produced for more general, non-commercial use. Necessary modifications for such specialty users often include installing electrically powered components in the passenger compartment, particularly on the upper portion of the dashboard to allow convenient access by the driver and/or other vehicle occupant(s). For example, a taxi company may require its cabs to be equipped with a fare meter, a delivery company may require its trucks or vans to be equipped with a two-way radio, GPS unit, and/or inventory tracking device, and a police department or emergency services organization may require any number of pieces of equipment to be mounted on the dashboard, such as a speed detection system (radar/lidar), a two-way radio, a video camera/recorder, a GPS system, and/or emergency lights.

Besides the fact that a dashboard mounting for these types of components provides easy access by the driver and/or passenger seat occupant, some such components (radar/lidar, video camera, for example) must be mounted above the dashboard to provide a view of the area ahead of the vehicle.

The current industry practice for this type of vehicle modification often requires that the vehicle's interior trim and/or instrument panel be removed or disassembled in order to install the electrical components and related wiring. The electrical equipment and related mounting brackets, which may sometimes be relatively heavy, are usually attached directly to the upper surface of the instrument panel. The exposed surfaces of instrument panels used in passenger vehicles (referred to in the industry as the Class-A surface) are typically formed of a relatively thin, plastic material since it is not intended to support significant weight. Self-tapping screws are commonly used to secure components to the IP housing, with the result that the screws can strip out of their holes and/or lose clamping load after a short period of use in the vehicle. Also, drilling holes into the instrument panel from the outside may result in debris falling into the internal instrument panel which may damage other components in the panel.

Particularly in the case of law enforcement or emergency vehicles, it may be desirable to mount several components in the instrument panel top area, such as radios, radar antennas units, emergency lights, and the like.

SUMMARY

In a first disclosed embodiment, an instrument panel for a motor vehicle comprises a frame securable to body structure of the motor vehicle, an upper dashboard surface disposed above the frame and having at least one mounting aperture formed therein, and at least one mounting bracket supported by the frame and aligned with the MA to removably receive an object. Attachment of the bracket to the instrument panel frame provides a rigidly supported hardpoint for the mounting of components, and the mounting aperture simplifies the installation of electrical wiring that may be associated with the components.

In another disclosed embodiment, apparatus for removably mounting at least one electrically powered component to a motor vehicle comprises an instrument panel frame securable to adjacent body structure of the motor vehicle, an instrument panel housing disposed above the frame and having an upper dashboard surface with at least one mounting aperture therein, at least one mounting bracket supported by the frame and extending beneath the mounting aperture to provide a hardpoint, an adapter module removably secured to the mounting bracket and having at least one component mounting feature for securing the at least one component to the adapter module, and vehicle electric wiring internal to the instrument panel housing and terminated by at least one connector matable with wiring associated with the component. The disclosed apparatus allows cost-effective and efficient customization of electrical components mounted to a vehicle instrument panel.

In another disclosed embodiment, apparatus for removably mounting at least one electrically powered component to a motor vehicle comprising an instrument panel frame securable to adjacent body structure of the motor vehicle, an instrument panel housing substantially surrounding the frame and having an upper dashboard surface with at least one mounting aperture formed therein, at least one mounting bracket supported by the frame and aligned with the mounting aperture to provide a hardpoint, vehicle electric wiring internal to the instrument panel housing and terminated by at least one connector, an adapter module removably secured to the mounting bracket, and an electrically powered component secured to the adapter module and electrically connected with the at least one connector.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
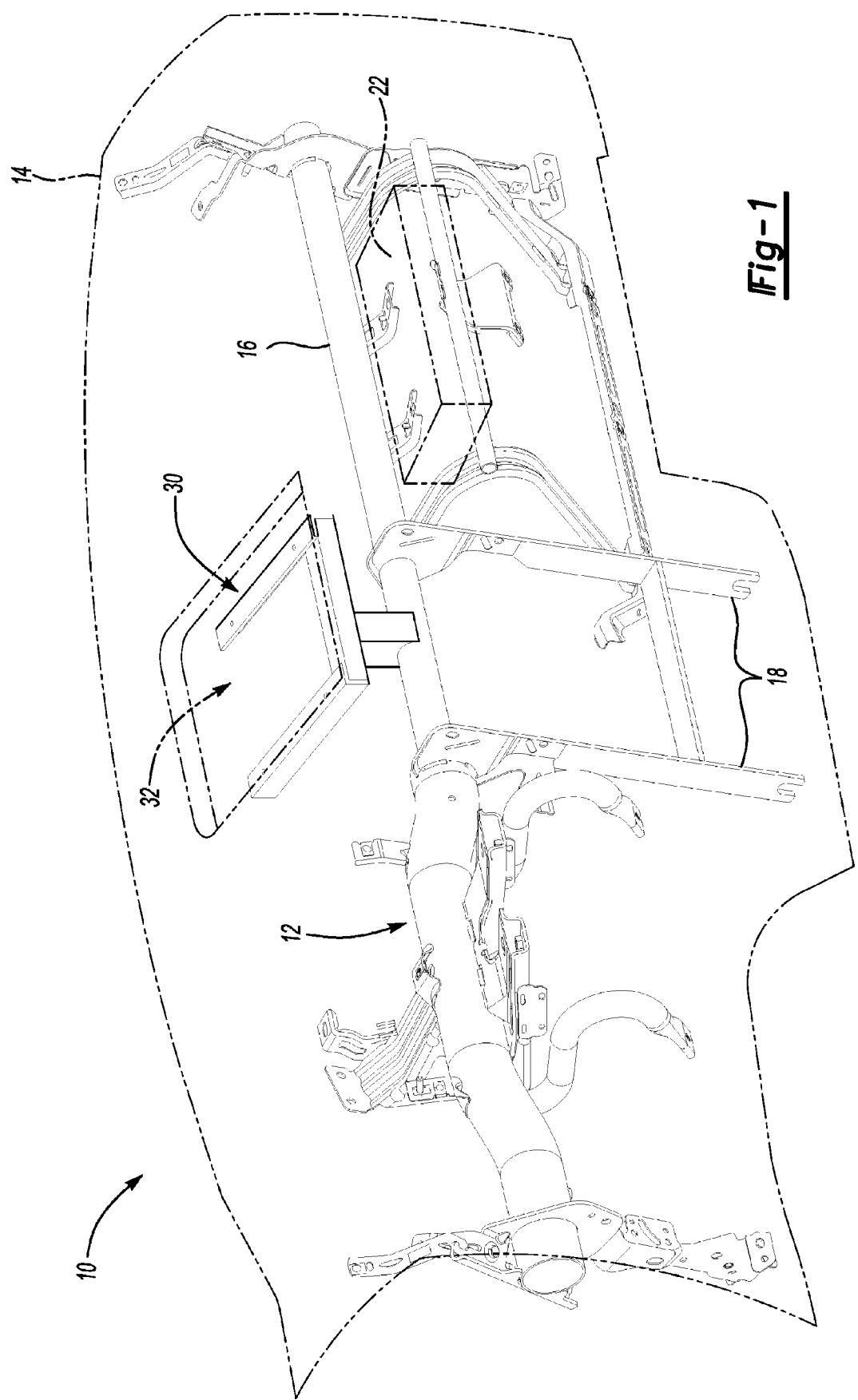
FIG. 1 is a schematic diagram of a vehicle instrument panel assembly.

As seen in FIG. 1, an instrument panel (IP) assembly 10 includes a rigid, structural frame 12, which may be formed of steel or other high-strength material, surrounded by an instrument panel (IP) housing 14. Frame 12 includes at least one cross beam 16 attached at either end to adjacent load-bearing structure located at left and right sides the vehicle frame such as the A-pillars 13 (see FIG. 4). IP frame 12 may also be attached to a vehicle floor pan (not shown) at the lower ends of a central console portion 18. IP frame 12 may support various vehicle components such as a steering column module (not shown), an air bag module 22, and HVAC ducts (not shown).

IP housing 14, as is well known in the automotive interiors arts, typically comprises one or more components made from various types of reinforced or unreinforced plastic materials. The exact material(s) used in IP housing 14 depends upon factors such as rigidity, appearance, tactile feel, durability, and economy. IP housing 14 may be supported by the frame 12 and/or by other adjacent structure in the vehicle passenger compartment.

While IP assembly 10 is depicted as being of the general type and configuration used in a 2-door or 4 door sedan vehicle, the present invention is equally applicable to any type of automotive vehicle that may be modified for commercial, law enforcement, or emergency response use. Such vehicles include mini- or full-size vans, pickup or panel trucks, sport-utility vehicles, cross-over vehicles, etc.

A mounting bracket 30 is secured to and supported by IP frame 12 and may be located at the approximate center of cross beam 16 and immediately below the upper surface of IP housing 14. A mounting aperture 32 is formed in the upper surface of IP housing 14 immediately above and aligned with mounting bracket 30. Mounting bracket 30 may be welded, bolted or otherwise rigidly secured to IP frame 12 to provide a hardpoint immediately below and aligned with aperture 32. The term hardpoint, as used herein, refers to a rigid component that is connected with a load-bearing portion of the vehicle body structure and adapted to serve as a mounting location for components that are to be mounted at a central, upper location on the IP, as will be described in greater detail below.

Figure 2:
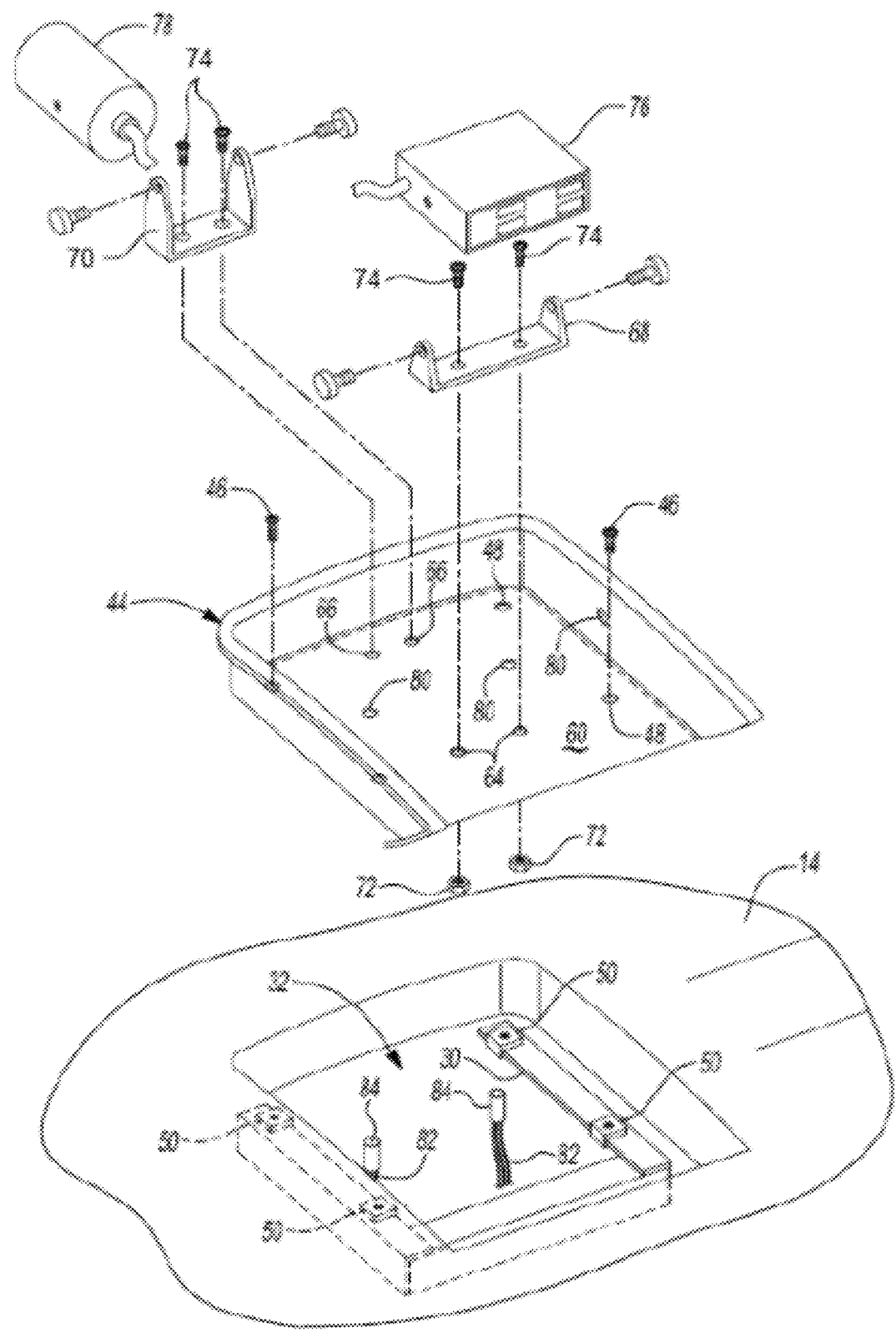
FIG. 2 is a partial exploded view of an adapter module and related instrument panel assembly.

In the exemplary embodiment shown in FIG. 2, mounting bracket 30 comprises two arms having a total of four threaded mounting holes 50 formed therein. Mounting holes 50 are shown fitted with self-locking U-nuts to provide the female threaded features. Any known alternative to U-nuts may be used to provide mounting holes 50 with threads, such as captive nuts or threaded inserts.

Vehicle wiring 82 is located within IP housing 14 and is connected with the vehicle electrical system (not shown), as is well known in the art. Vehicle wiring 82 may be terminated by electrical connectors 84 such as cannon plugs or other type of appropriate single- or multi-pin connectors.

Aperture 32 is located on the upper surface of IP housing 14 to be in proper alignment with mounting bracket 30 so that the bracket may be accessed through the aperture. In the embodiment depicted, aperture 32 is located at the approximate center portion of the upper surface of IP housing 14, and is directly above and forward of a center console 36 of the IP assembly panel 10.

An adapter module 44 is configured to fit into aperture 32 and be removably secured to the hardpoint provided by mounting bracket 30. In the depicted embodiment, removable attachment of adapter module 44 to hardpoint 34 is accomplished by means of bolts 46 which pass through bolt holes 48 formed in the adapter module and engage threaded mounting holes 50 in the appropriate locations on mounting bracket 30.

Figure 3:
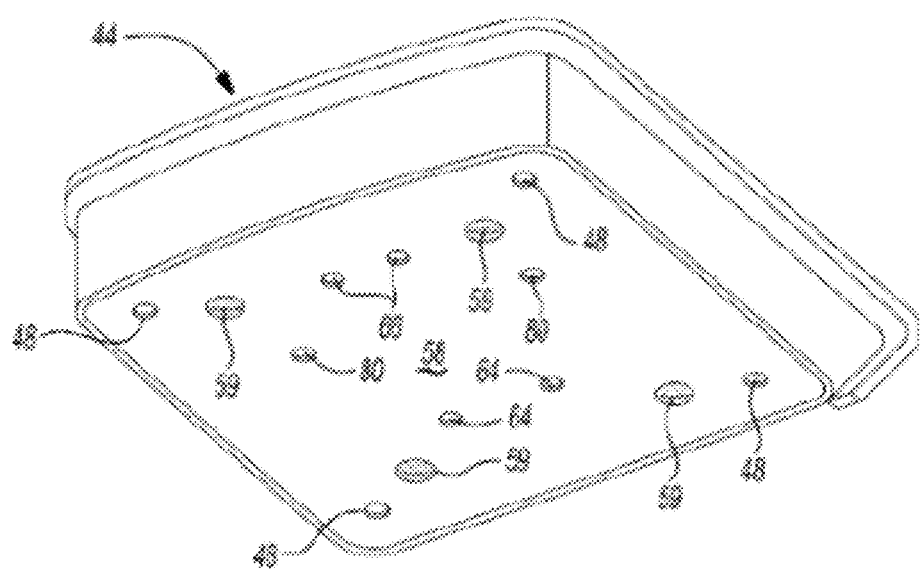
FIG. 3 is a perspective bottom view of the adapter module of FIG. 32.

In the embodiment of FIGS. 2 and 3, adapter module 44 comprises a plastic body 56 and a carrier plate 58 formed of a high-strength material such as steel or aluminum. Carrier plate 58 may be heat-staked to the lower surface of body 56 (heat-stake bosses are indicated at 59 in FIG. 3), or it may be secured to the body in another appropriate method (threaded inserts/fasteners, over-molding, etc.). Mounting holes 48 preferably pass through carrier plate 58 so that when adapter module 44 is bolted to mounting bracket 30 the plate provides a secure and rigid mounting platform. An upper mounting surface 60 may be flat and generally horizontal, and may be recessed below the upper surface of IP housing 14 when installed in the IP, as shown. If there is insufficient room inside IP housing 14, or due to other packaging constraints, the adapter module may be configured to place the mounting surface generally flush with the adjacent upper surface of the IP housing 14.

Adapter module 44 includes component mounting features to facilitate simple and efficient mounting of the necessary equipment. In the exemplary embodiment of FIG. 3, these features include component mounting holes 64 and 66 which allow a first equipment bracket 68 and a second equipment bracket 70 to be secured to mounting surface 60 by means of bolts 72 and nuts 74. Brackets 68, 70 may receive components such as a radar control unit/read-out 76 and a radar antenna 78.

Wiring holes 80 are formed in mounting surface 60 and/or in the surrounding wall of body 56 at appropriate locations to allow electrical wires associated with the components 76, 78 to be connected with vehicle wiring 82, as will be described below.

Figure 4:
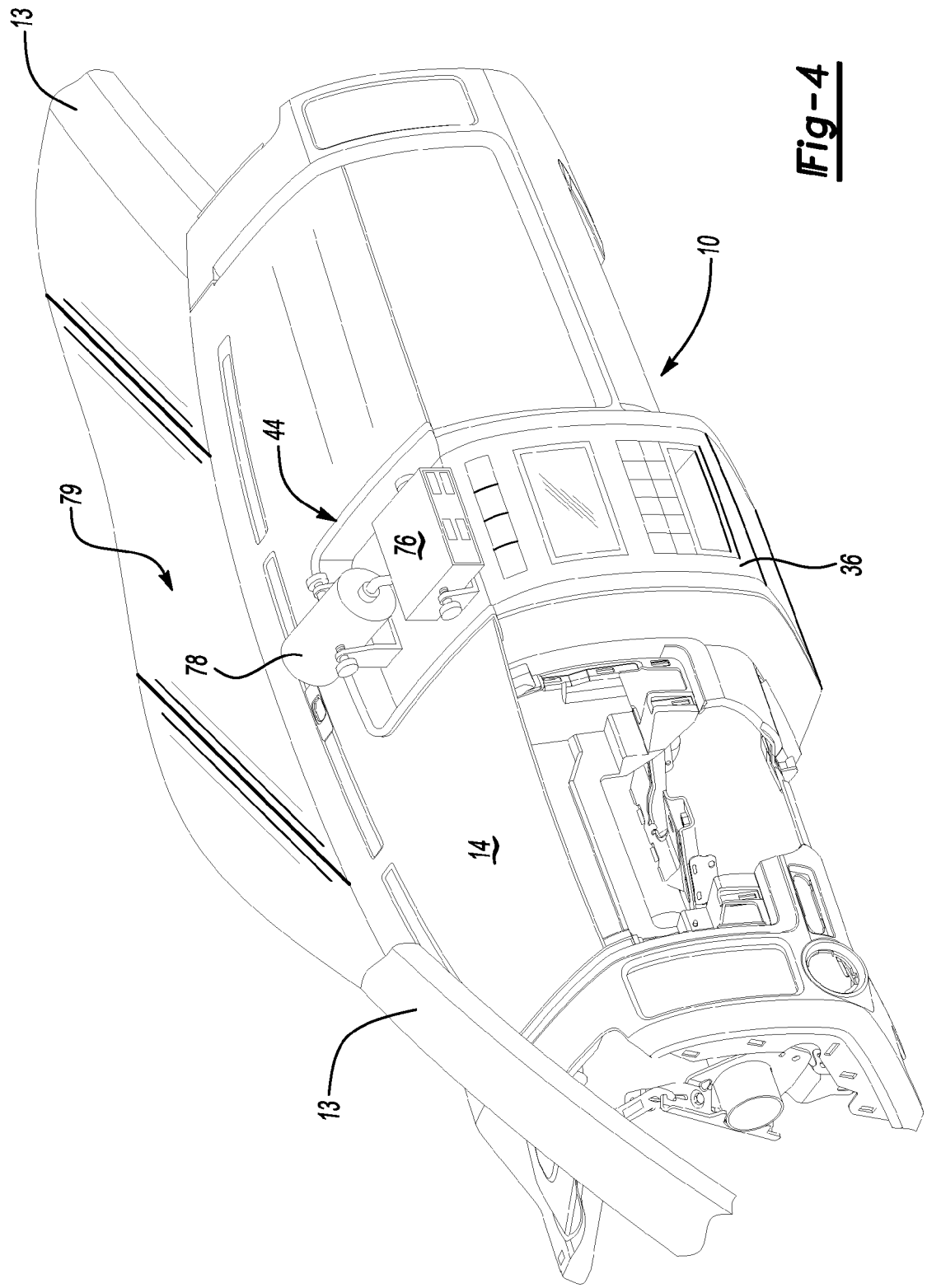
FIG. 4 is a partial perspective view of an instrument panel with the adapter module of FIG. 2 installed.

As seen in FIG. 4, adapter module 44 is installed in IP assembly 10 such that components 76, 78 are located centrally with respect to the upper surface of IP housing 14, thereby providing convenient access by occupants of the vehicle. Body 58 is shown to include an outwardly-curved lip 58a that overlaps and seals with the adjacent edges of IP housing 14. Appropriate equipment brackets, such as 70, may be used as necessary to elevate components to provide a field-of-view thorough windshield 79.

An automobile produced by an original equipment manufacture (OEM) for use by the general public generally does not include provisions to mount the type of components needed in commercial, law enforcement, or emergency service version of the vehicle, hereinafter referred to as specialty vehicles. As such, the IP assembly 10 may be constructed with some other convenience feature or component located in the area of aperture 32. Such features may include a covered storage bin, an audio speaker, or a video display.

Since the needs of the users of specialty vehicle vary greatly, it is generally not practical for an OEM to produce vehicles that are fully equipped and ready to enter service. In such cases, the OEM may provide a vehicle directly to the end-user for modification/customization. It is also common for the end-user to contract with an intermediary company that specializes in modification of vehicles, commonly known as an up-fitter. For example, an up-fitter may, under contract to a law enforcement agency (LEA), install a suite of equipment specified by the LEA. Such equipment may include speed monitoring radar or lidar units, 2-way radios or other communications equipment, GPS units, emergency lights, video cameras/recorders, portable computers, or the like.

As sold to the end-user or up-fitter, the vehicle may include an adapter module with no mounting holes, wiring holes, or other component mounting features, with the appropriate features required for the specific equipment suite being added to the adapter module later.

The up-fitter will generally need to install additional vehicle electrical wiring within the IP housing 14 to supply power and/or electronic connectivity to the components. This wire installation is greatly simplified by the fact that that adapter module 44 may be unbolted and removed from aperture 32, leaving a large opening though which the interior of IP housing 14 may be accessed.

The up-fitter may mount the component(s) specified by the end-user to adapter module 44 using appropriate holes, brackets 68, 70 and/or other component mounting features, and route electric wiring ("pig tails") extending from the components through the wire openings 80. Seals may also be installed in the wire openings 80 if necessary.

In a possible installation process, adapter module 44 is unbolted and removed from aperture 32. The adapter module may then be taken to a work station remote from the vehicle where all drilling, punching, machining or other required assembly steps may be performed. The components are mounted to adapter module 44 in the desired manner and location, and related wiring is routed through the wiring holes and terminated with appropriate connectors.

The completely assembled adapter module 44 is then returned to the vehicle, held or otherwise suspended close to aperture 32, and cannon plugs 84 associated with vehicle wiring 82 are connected with the mating wiring connectors extending from the bottom of the adapter module. Adapter module 44 is then lowered into position in aperture 32, bolts 46 are inserted through respective mounting holes 48 and into engagement with threaded mounting holes 50 and tightened down securely.

The disclosed apparatus provides a much more secure, robust, and repeatable mounting system for components than the conventional method of simply drilling holes into the upper surface of the IP housing and/or using self-tapping screws or the like. Eliminating the need to drill mounting holes and/or drive screws into the IP housing removes the chance that chips or other debris may fall into the interior of the IP housing and damage or otherwise interfere with the operation of vehicle systems.

Figure 5A:
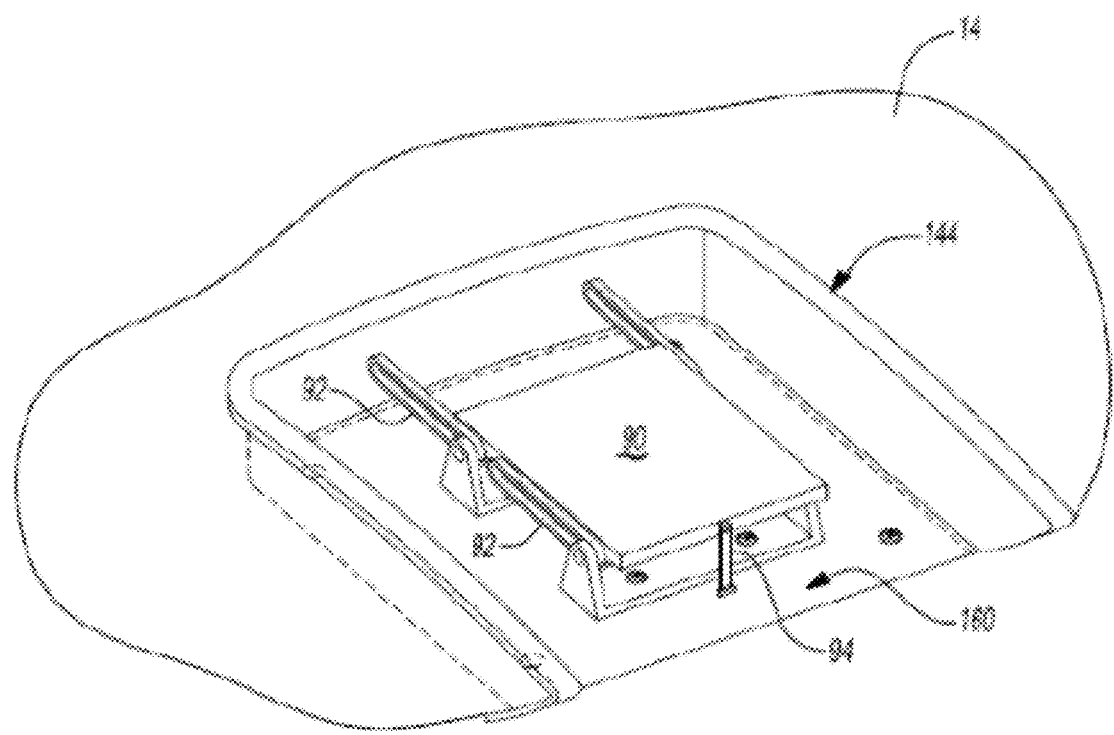
FIG. 5A is a schematic perspective view of an adapter module having a retractable mounting plate in a stowed position.
Figure 5B:
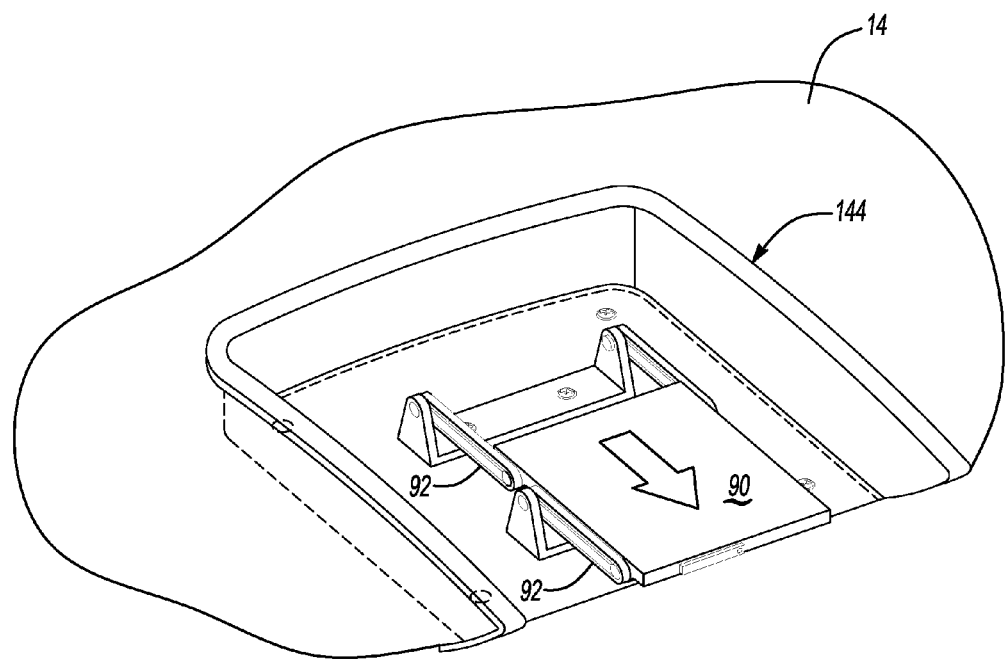
FIG. 5B is view the adapter module of FIG. 5A with the mounting plate in an extended position.

FIGS. 5A, 5B depict an adapter module 144 having an extendable component platform 90 movably secured to mounting surface 160 by a sliding linkage 92. Component platform 90 may be held in the stowed position shown in FIG. 5A by a manually actuated latch 94. When latch 94 is released, component platform 90 may be deployed rearwardly to the open position shown in FIG. 5B. In the open position, a component attached to component platform 90 (such as a key-board, not shown) is positioned in a more ergonomically correct position relative to the user. Other known types of folding and/or telescoping mechanisms may be provided to allow convenient positioning of components attached to adapter module 144. A mechanism of this type may also allow the component platform to tilt downward, angling the surface toward a user.

Figure 6:
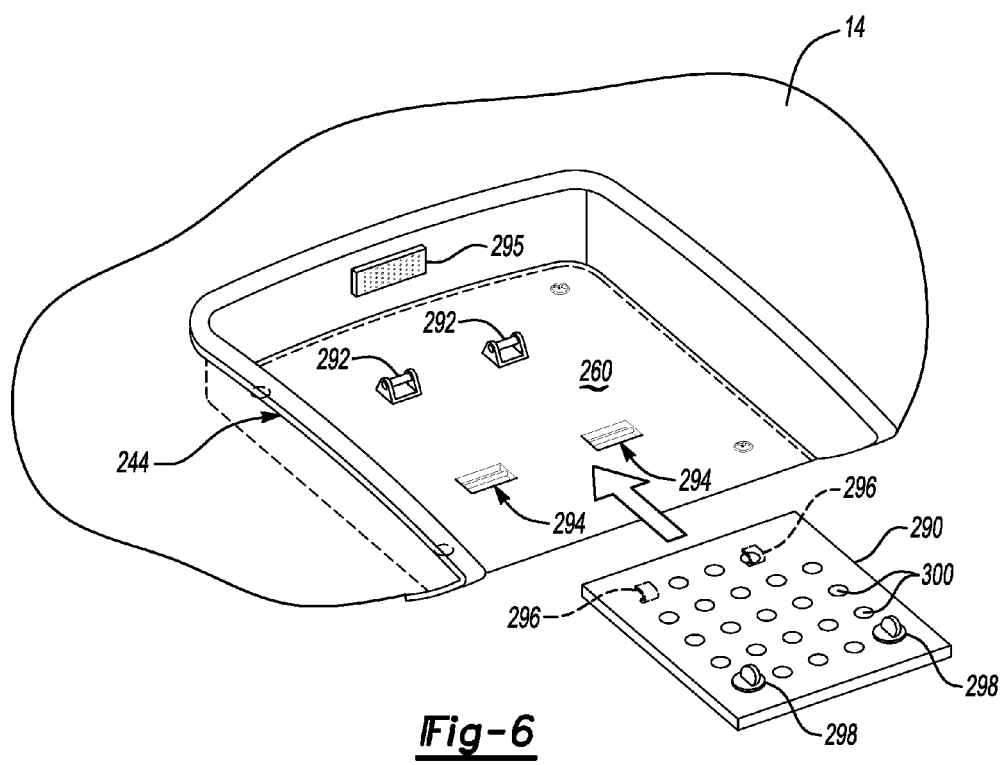
FIG. 6 is a simplified perspective view of an adapter module and a removable mounting plate.

The adapter module 244 shown in FIG. 6 includes component mounting features in the form of a quick-release fitting.

The quick release fitting may comprise tie bars 292 and latch strikers 294 formed in or on mounting surface 260. Mounting plate 290 has tie hooks 296 disposed on its lower surface to engage tie bars 292, and latch mechanisms 298 adjacent the opposite edge to engage latch strikers 294, thereby releasably securing the mounting plate 290 to the module 244. Mounting plate 290 may be provided with an array of threaded and/or unthreaded holes 300 in a pattern to provide a large number of alternative, flexible mounting options for various brackets and/or components. A multi-pin electronic connector 295 may be disposed on the rear wall of adapter module 244 to mate with a connector (not shown) provided on a component secured to plate 290 when the plate is secured in place.

Figure 7:
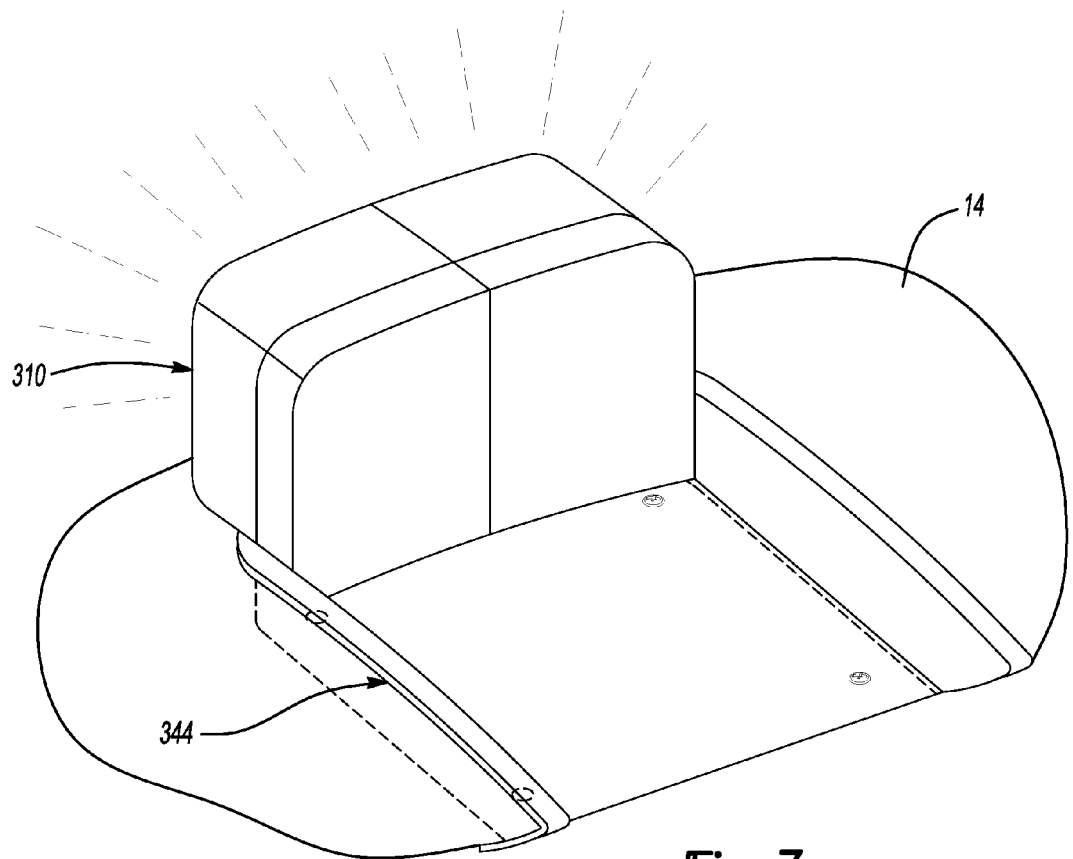
FIG. 7 is a simplified perspective view of an adapter module having an integrated lighting unit.

As seen in FIG. 7, an adapter module 344 includes an integrated emergency lighting unit 310 of appropriate color (s) to signify an emergency vehicle. When adapter module 344 is secured in aperture 32, lighting unit 310 is positioned immediately behind the center lower portion of a windshield 79 and adjacent the forward edge of the IP upper surface. Additional electrical components may be secured to adapter module 344 as discussed in relation to the other disclosed embodiments.

Figure 8:
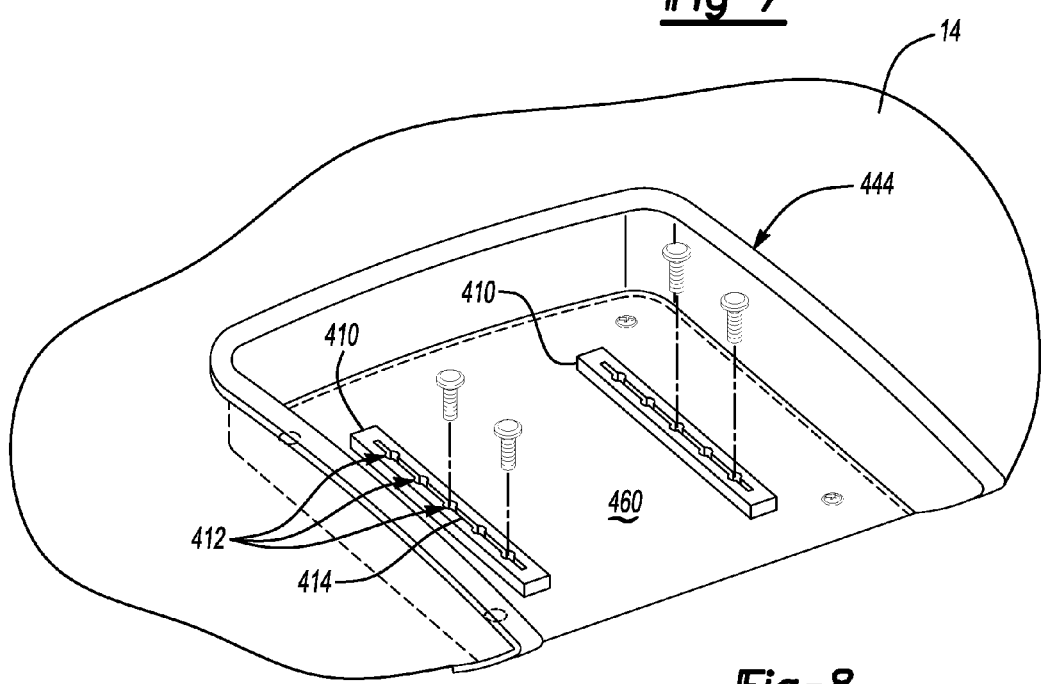
FIG. 8 is a simplified perspective view of an adapter module fitted with an integrated accessory tracks.

As seen in FIG. 8, a further embodiment of an adapter module 444 includes one or more accessory tracks 410 located on mounting surface 460. Accessory tracks 410 may be formed integrally with the body of adapter module 444 or may be secured in place by any appropriate means, such as adhesive, heat staking, threaded fasteners, etc. Accessory tracks 410 have a plurality of index positions 412 for positively locating a component and/or a bracket, and may include a central slot 414 connecting the index positions 412 to allow the component or bracket to slide between index positions.

Figure 9A:
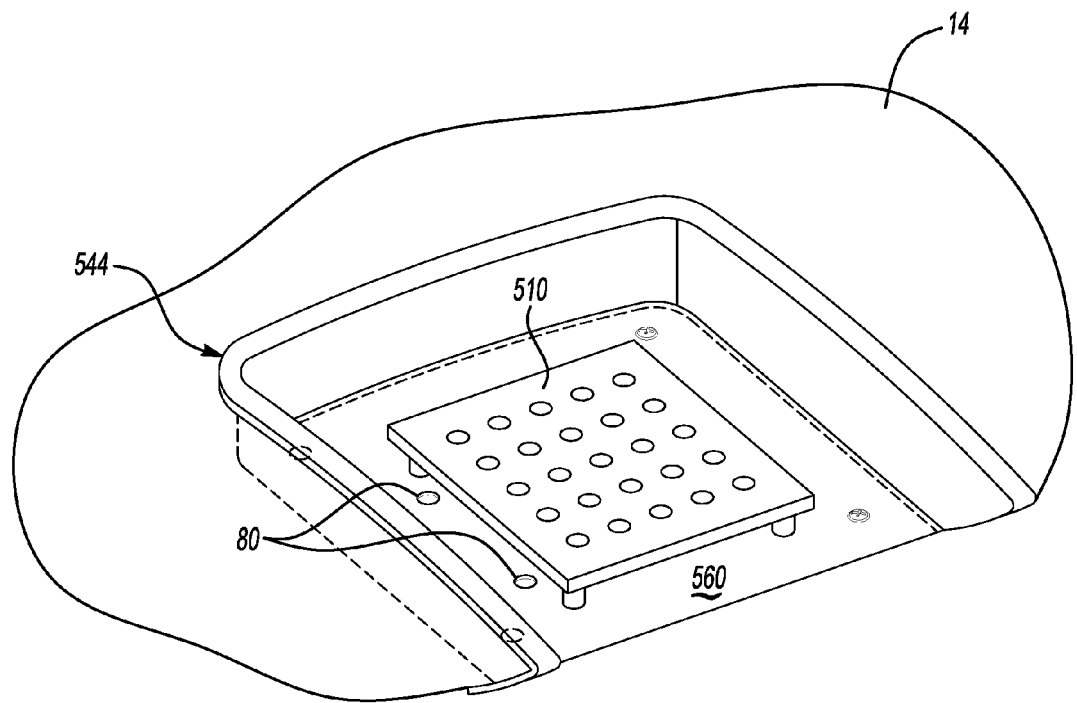
FIG. 9A is a simplified perspective view of an adapter module fitted with an universal mounting plate.

FIG. 9A, shows a further embodiment of an adapter module 544 having a universal mounting plate 510 covering a portion of or the entire mounting surface 560. Universal mounting plate 510 may have an array of threaded and/or unthreaded holes for receiving fasteners to mount the desired components. As with the other disclosed embodiments, wiring holes 80 are provide through which wiring for the electrical components passes to connect with vehicle wiring inside of the IP housing 14.

Figure 9B:
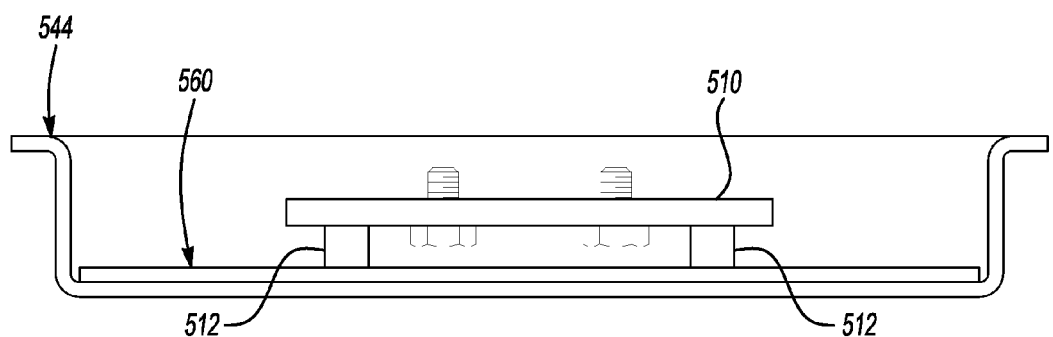
FIG. 9B is a detailed view of the universal mounting plate of FIG. 9B.

As seen in FIG. 9B, universal mounting plate 510 may be attached to mounting surface 560 by spacers 512 to provide a clearance gap between the lower surface of universal mounting plate 510 and mounting surface 560 of adapter module 544.

Figure 10:
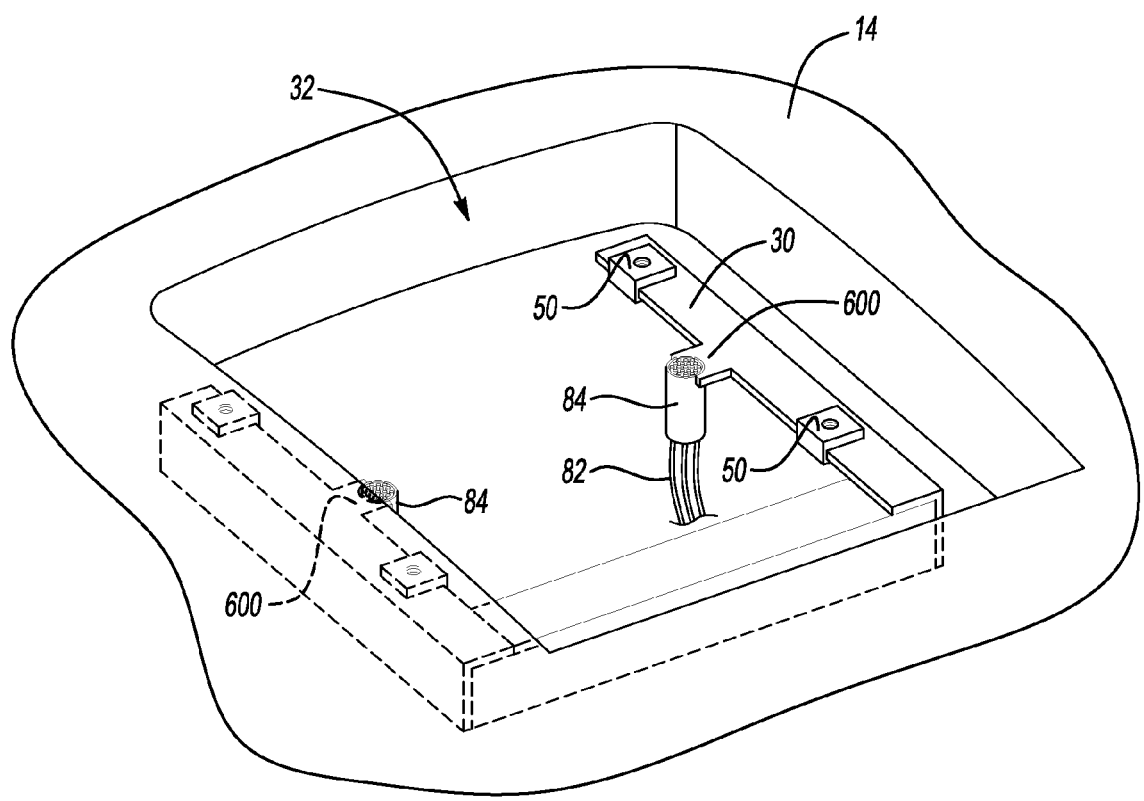
FIG. 10 is a simplified perspective view of a second embodiment of a mounting bracket.

FIG. 10 depicts a mounting bracket 30 having two connector retaining clips 600 attached, each of which holds an electrical connector 84 terminating a length of vehicle wiring 82. Electrical connectors 84 are positioned to mate with connectors fitted to the underside of an adapter module (not shown) when the adapter module is secured to mounting bracket 30.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

What is claimed:

1. An instrument panel for a motor vehicle comprising:
a frame securable to body structure of the motor vehicle;
an upper dashboard surface disposed above the frame and having a mounting aperture formed therein;
a mounting bracket supported by the frame and aligned with the mounting aperture; and
an adapter module removably securable to the bracket to position a generally horizontal mounting surface of the adapter module adjacent to the mounting aperture, the adapter module having a component mounting feature accessible from above the upper dashboard surface to removably attach and detach an electrically powered component to the adapter module; and
an electrical connector fixed to the mounting bracket for engagement with a mating connector associated with the electrically powered component when the adapter module is secured to the mounting bracket.

2. The instrument panel according to claim 1 wherein the mounting aperture is located proximate to a center of the frame.

3. The instrument panel according to claim 1 wherein the mounting bracket comprises a threaded fastener for removably securing the adapter module to the mounting bracket.

4. The instrument panel according to claim 1 wherein the component mounting feature comprises at least one of a quick-release fitting, an accessory track, and a universal mounting plate.

5. The instrument panel according to claim 1 wherein the component mounting feature comprises a retractable mounting movable between a stowed condition and a deployed condition.

6. The instrument panel according to claim 1 wherein the mating connector associated with the electrically powered component is fixed to the adapter module.

7. An instrument panel for a motor vehicle comprising:
a frame securable to body structure of the motor vehicle;
an upper dashboard surface disposed above the frame and having a mounting aperture formed therein; and
a mounting bracket supported by the frame and aligned with the mounting aperture;
an adapter module removably securable to the bracket to position a generally horizontal mounting surface of the adapter module adjacent to the mounting aperture, the adapter module having a component mounting feature for removably securing an electrically powered component thereto, the component mounting feature accessible from above the upper dashboard surface to attach and detach the electrically powered component; and
an electrical connector fixed to the mounting bracket and engageable with a mating connector on the adapter module when the adapter module is secured to the bracket.

8. The instrument panel according to claim 7 wherein the mounting aperture is located proximate to a center of the frame.

9. The instrument panel according to claim 7 wherein the mounting bracket comprises a threaded fastener for removably securing the adapter module to the mounting bracket.

10. The instrument panel according to claim 7 wherein the component mounting feature comprises at least one of a quick-release fitting, an accessory track, and a universal mounting plate.

11. The instrument panel according to claim 7 wherein the component mounting feature comprises a retractable mounting movable between a stowed condition and a deployed condition.

* * * * *